(12) United States Patent
Roe, Jr. et al.

(10) Patent No.: US 7,425,150 B1
(45) Date of Patent: Sep. 16, 2008

(54) ELECTRICAL SPEED BOX WITH SINGLE-DRIVE LOCKING PIN

(76) Inventors: George S. Roe, Jr., 5355 new kings Rd.#56, Jacksonville, FL (US) 32209; Henry W. Price, Jr., 2878 chelton Rd., Jacksonville, FL (US) 32216

(*) Notice: Subject to any disclaimer, the term of this patent is extended or adjusted under 35 U.S.C. 154(b) by 7 days.

(21) Appl. No.: 11/640,763

(22) Filed: Dec. 18, 2006

(51) Int. Cl.
*H02G 3/08* (2006.01)
(52) U.S. Cl. .......................... 439/538; 174/53
(58) Field of Classification Search .............. 439/538, 439/535, 539; 174/53
See application file for complete search history.

(56) References Cited

U.S. PATENT DOCUMENTS

| | | | | |
|---|---|---|---|---|
| 5,823,821 A | * | 10/1998 | Tohanczyn, Jr. | 439/538 |
| 6,609,927 B2 | * | 8/2003 | Kidman | 439/538 |
| 7,118,413 B2 | * | 10/2006 | Kidman | 439/538 |
| 7,198,514 B1 | * | 4/2007 | Grimes | 439/538 |

* cited by examiner

*Primary Examiner*—Gary F. Paumen
(74) *Attorney, Agent, or Firm*—Matthew P. Davies

(57) ABSTRACT

A reusable quick installation electrical junction box for securing electrical devices and faceplates using a single-drive locking pin. The single-drive locking pin is a reusable locking pin used to secure an electrical device and faceplate to the electrical speed box through a concerted driving motion involving insertion into the engaging mechanism followed by 90 degree rotation.

20 Claims, 3 Drawing Sheets

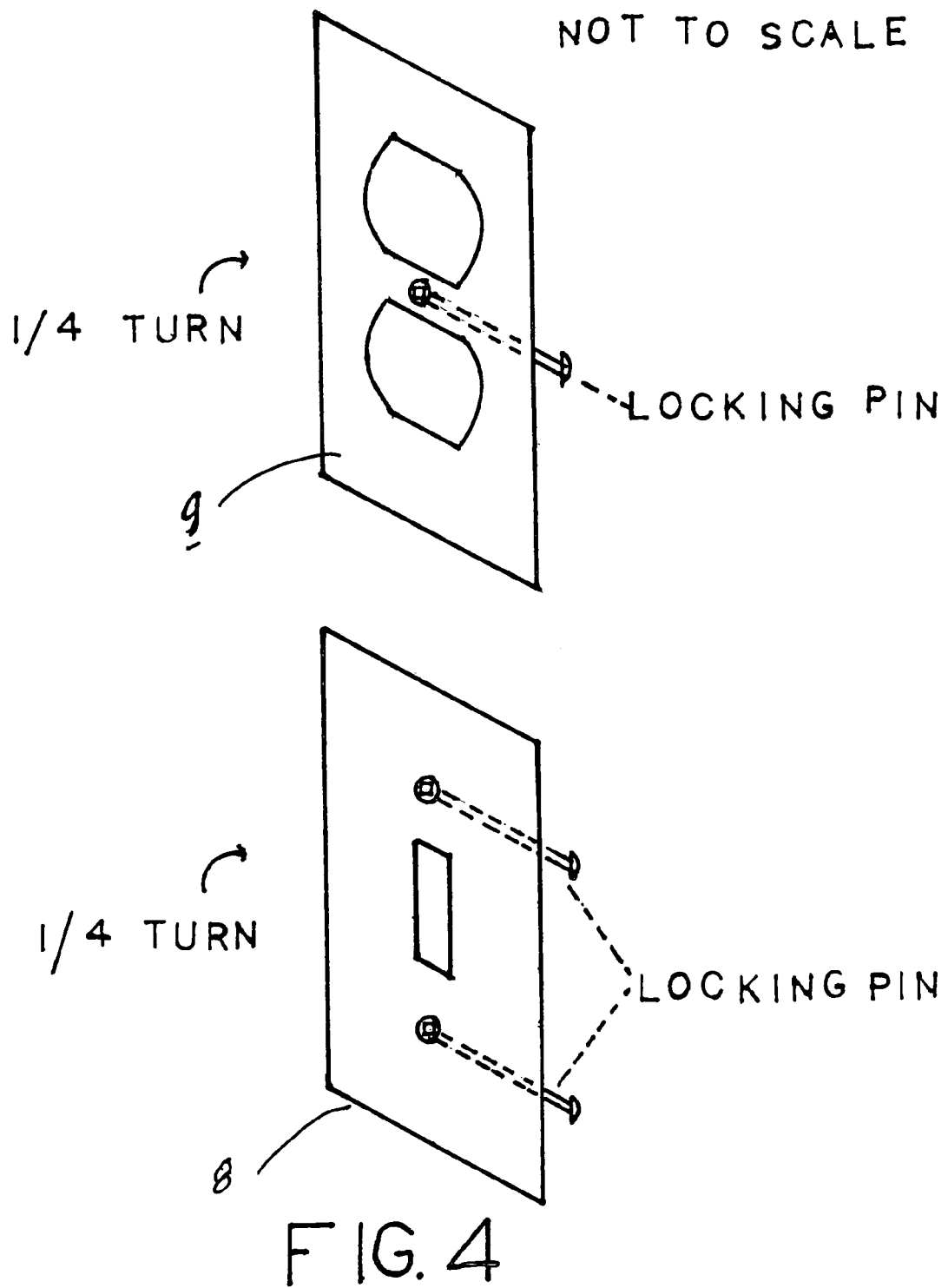

ELECTRICAL SPEED BOX WITH SINGLE-DRIVE LOCKING PIN

BACKGROUND OF INVENTION

1.) Field of the Invention

This invention relates generally to a reusable quick installation electrical junction box for securing electrical devices, devices and faceplates using a single-drive locking pin.

2.) Discussion

Typical electrical junction boxes employ threaded screws to fasten an electrical fixture or device to a junction box. A faceplate is then fastened to either the electrical device or the junction box with similarly threaded screws. This process can involve the installation of multiple screws and requires perfect alignment so as to avoid incorrect placement and subsequent misalignment of the electrical device on the electrical junction box. These types of electrical junction boxes are used for many different electrical devices including without limitation, outlets, light switches, cable, computer networks, and telephone devices.

One drawback to these types of devices is the time in which it takes to provide rotation to a screw either manually or automatically through the use of an electric power tool. An electrical power tool may simplify the process and reduce the time required for installation. Power tools, however, require bulky and expensive equipment such as cords or batteries, to provide electricity and ultimately may not significantly reduce the demands on the installer. The time lost in assembly may have an undesirable effect on the managed resources of construction personal and equipment. Therefore it would be desirable to reduce the installation time without increasing the size, weight, or complexity of the attaching or receiving engagement device.

One solution is to use plastic inserts to anchor the fastening screw without the need for rotation. This solution also provides for a faceplate free of holes or exterior attachment points. These devices however, add to the overall complexity and manufacturing costs. Therefore it is the object of this invention to solve one or more of these problems.

SUMMARY OF THE INVENTION

In accordance with the teachings of this invention, an electrical speed box is a standard electrical junction box adapted for the quick attachment of electrical devices and faceplates. In addition a single-drive locking pin is a locking pin used to secure an electrical device and faceplate through a concerted driving motion involving insertion followed by rotation.

One embodiment relates to a reusable engaging member of the electrical speed box. The electrical speed box having walls arranged at the top, bottom, either side, and an open face as disclosed in the prior art. Whereas the engaging member contains an engaging mechanism which consists not of traditional threaded connections but rather may be a formed receiver or stop defined as a series of holes, grooves, notches, recesses, slots, etc., of any shape including but not limited to rectangular, oval, circular, or the like. The holes are spaced at a regular distance apart to engage the flanged end of the single-drive locking pin upon 90 degree rotation.

A second embodiment of the present invention relates to a removable single-drive locking pin for attaching a portion of an electrical device to a portion of the electrical speed box. The locking pin may be inserted a chosen distance into the engaging member until the electrical device is securely fastened to the electrical speed box.

A further embodiment of the present invention relates to an engaging member contained within an electrical device for attaching a portion of an electrical device to a portion of a faceplate. The locking pin may be inserted a chosen distance into the engaging member until the faceplate is securely fastened to the electrical device.

By utilizing a locking pin that engages the engaging mechanism with only a 90 degree turn the potential missthreading and loss of time through the use of traditional rotating screws is avoided. Thus the electrical device is securely attached to the electrical speed box with out cause for mal alignment of the electrical device and with less time and effort expended by the installer.

BRIEF DESCRIPTION OF DRAWINGS

These and other features, aspects, and advantages of the present invention will become better understood with regard to the following description, appended claims, and accompanying drawings where:

FIG. 4 shows a duplex receptacle faceplate and switch plate cover.

DETAILED DESCRIPTION OF THE INVENTION

Figure 1:
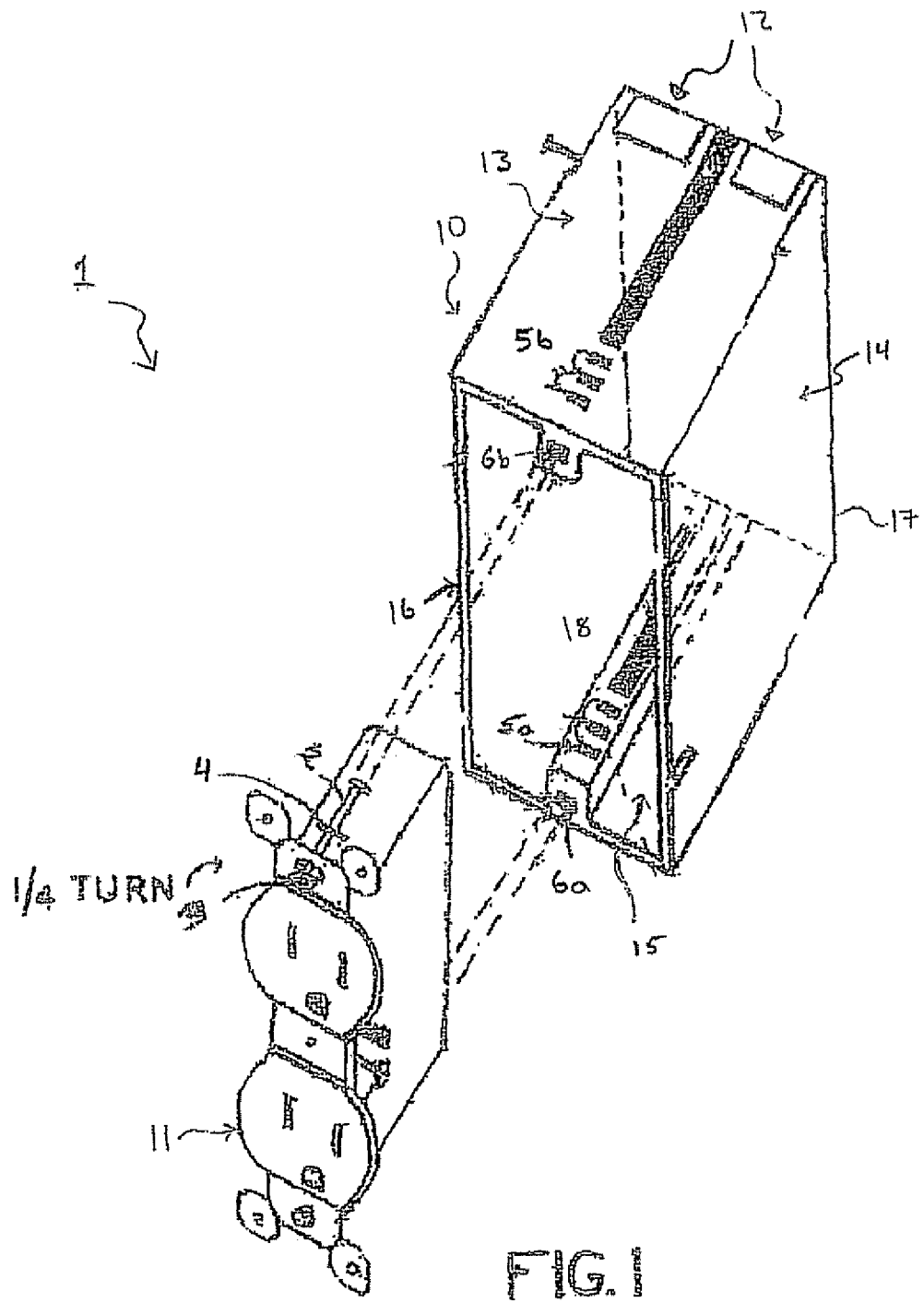
FIG. 1 is a perspective view of the electrical speed box with an unattached duplex receptacle.

Referring now to the drawings, and more particularly FIG. 1, the present invention includes an electrical speed box with a single-drive locking pin assembly 1. Assembly 1 includes an electrical speed box 10, electrical device 11, and a single-drive locking pin 2. The electrical speed box 10 includes an open face front side 18, a back wall 17, top and bottom walls 13 and 15, and opposed side walls 14 and 16. Engaging members 6a and 6b may be located on top and bottom walls 13 and 15 of speed box 10 to aid in securing electrical devices. Similarly engaging members may be disposed within an electrical device as shown in FIGS. 1 and 4.

Speed box 10 may have an open back exit 12. Open back exit 12 may be open to the exterior of the electrical speed box 10. As is commonly disclosed in the electrical prior art, electrical devices may be housed within the interior 18 of speed box 10, with electrical wires extending through the back exit 12.

The electrical speed box 10 in accordance with the present invention may be of any size and may be a single gang, double gang, triple gang, quadruple gang, quintuple gang, sextuple gang, or the like. The speed box 10 may be constructed, formed, machined, extruded, molded, cast, or otherwise made from any suitable material including but not limited to metal, plastic, fiberglass, composite, or the like.

Figure 2:
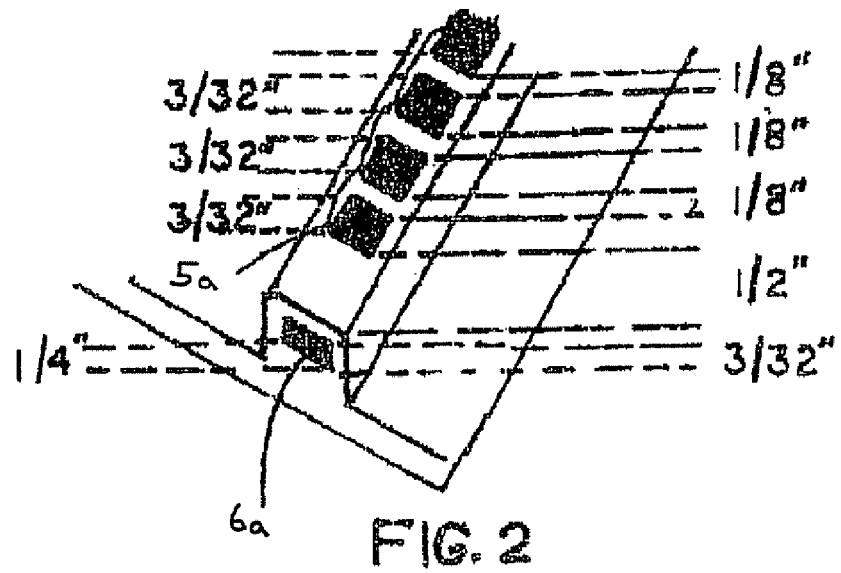
FIG. 2 shows a perspective view of the channel the single-drive locking pin enters and the locking pin stops.

An engaging member 6a and 6b of speed box 10 are constructed, formed, machined, extruded, molded, cast, or otherwise to receive the single-drive locking pin 2 as shown in FIG. 2 and may be molded or otherwise constructed in its original forming process as part of the electrical speed box 10.

At regular intervals of any distance, engaging member 6a has holes 5a, notches 5a, grooves 5a, recesses 5a, slots 5a, or the like. These holes 5a may be open to the interior 18 and the exterior of the speed box 10. These holes 5a may be of any size to engage and retain the single-drive locking pin 2 upon insertion into engaging member 6a and rotation of 90 degrees.

Figure 3:
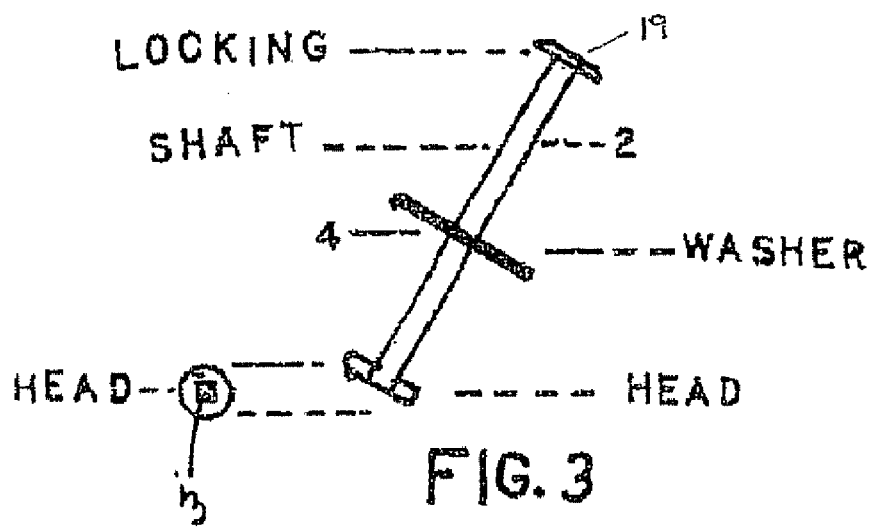
FIG. 3 shows the single-drive locking pin.

As shown in detail in FIG. 3 a single-drive locking pin 2 of a selectable length may be chosen to allow insertion of the single-drive locking pin 2 a desired distance into the engaging member 6a. The single-drive locking pin 2 may be of any size or length and may be constructed, formed, machined, extruded, molded, cast, or otherwise made from any suitable material including but not limited to metal, fiberglass, composite, or the like.

The locking mechanism 19 of the single-drive locking pin 2 may comprise a flattened, tapered, or crimped flange 19 on one end to be retained, through a 90 degree rotation, within the holes 5a of the engaging mechanism 6a, thus securing the electrical device 11 to the electrical speed box 10. The head 3 of the single-drive locking pin 2 may be formed as shown in FIG. 3 with a Robinson type socket, pan shaped head to fit a #1 size screw lock driver. The head 3 of the single-drive locking pin 2 may be of any size or type including but not limited to a button, round, oval, truss, bugle, or flat shaped head and may be formed as a flathead, Phillips, star, hex, triple square, socket or the like. Additionally the single-drive locking pin 2 may include a washer 4, the size of which may be chosen to aid in attaching the electrical device 11 to the speed box 10 as shown in FIG. 1.

In accordance with the present invention FIG. 4 illustrates one embodiment of a faceplate 8 used to cover the electrical device 11 and wiring contained within the speed box 10. The faceplate 8 shown is a switch plate which may be any size and formed of any suitable material. The faceplate 8 as illustrated has two points of attachment (above and below the toggle switch cutout) through which the single-drive locking pin 2 would pass and be retained by engaging mechanism 6a in the speed box 10.

In an alternative embodiment as illustrated in FIG. 4 the faceplate 9 has a single point of attachment at the center located between each receptacle cutout. Selected devices in accordance with the present invention may include engaging member 6a located internally in the electrical device 11 on the centerline between each receptacle of a duplex receptacle electrical outlet. Such engaging member 6a may be constructed, formed, molded, machined, extruded, cast or otherwise constructed in its original forming process as part of the electrical device 11 to receive and retain the single-drive locking pin 2.

The various embodiments of the present invention as shown in FIGS. 1-4 may be arranged and designed in a wide variety of different configurations that fall with in the scope of the present invention, and may be applied to any type of removable faceplate including but not limited to receptacles, jacks, telephones, cable, network, outlets, switches, or the like.

In short, the apparatus for securing electrical devices provides a unique design for quickly securing electrical devices and faceplates to an electrical speed box. This removable securing apparatus utilizes a locking mechanism that engages and retains an engaging mechanism of the electrical speed box through a single concerted motion of insertion and rotation of 90 degrees or ¼ turn. By utilizing a locking pin that requires only a single concerted motion, substantial time is saved in securing an electrical device to an electrical speed box.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

The invention claimed is:

1. An apparatus for securing electrical devices comprising:
    an electrical speed box for use in housing electrical devices and wires, having an engaging member; and
    a removable single-drive locking pin having a locking mechanism for securing an electrical device to said electrical speed box through first non-rotating linear insertion followed by a single 90 degree rotation.

2. The apparatus of claim 1, wherein said engaging member contains an engaging mechanism which has a plurality of non threaded stops configured to selectively position said single-drive locking pin at a chosen location with respect to said electrical speed box.

3. The apparatus of claim 2, wherein said stops have portions defining a hole, notch, groove, recess, slot, etc.

4. The apparatus of claim 2, wherein the purpose of said portions defining a hole is to receive, engage, and retain said locking mechanism of said single-drive locking pin.

5. The apparatus of claim 4, wherein the engagement of said locking mechanism to said engagement mechanism occurs through first non-rotating linear insertion followed by a single 90 degree rotation of said locking mechanism into said engagement mechanism.

6. The apparatus of claim 1, wherein said single-drive locking pin is a shaft having a head at the distal end thereof, and said locking mechanism at the other end.

7. The apparatus of claim 6, wherein said locking mechanism has portions defining a flange.

8. The apparatus of claim 7, wherein said flanged locking mechanism extends perpendicular to the shaft.

9. The apparatus of claim 6, wherein said head has a formed recess for mating with a tip or driver.

10. The apparatus of claim 6, wherein said locking mechanism is removable such that said single-drive locking pin can be manually disengaged from said engaging mechanism through first 90 degree rotation followed by non-rotating linear removal to uncouple said electrical device from said electrical speed box.

11. The apparatus of claim 1, further comprising a second single-drive locking pin with locking mechanism and corresponding second engaging mechanism.

12. The apparatus of claim 1, wherein said electrical device further includes an engaging mechanism.

13. An apparatus for securing electrical devices comprising:
    an electrical speed box for use in housing electrical devices and wires, having an engaging member;
    a plurality of removable single-drive locking pins having locking mechanisms for securing an electrical device to said electrical speed box and a faceplate to an electrical device through first non-rotating linear insertion followed by a single 90 degree rotation; and
    an engaging mechanism disposed within said electrical device and being capable of engaging and retaining said locking mechanism.

14. The apparatus of claim 13, wherein said engaging member contains an engaging mechanism which has a plurality of non threaded stops configured to selectively position said single-drive locking pin at a chosen location with respect to said electrical speed box.

15. The apparatus of claim 14, wherein said stops have portions defining a hole, notch, groove, recess, slot, etc., designed to engage the locking mechanism.

16. The apparatus of claim 15, wherein the engagement of said locking mechanism to said engagement mechanism occurs through first non-rotating linear insertion followed by a single 90 degree rotation of said locking mechanism into said engagement mechanism.

17. The apparatus of claim 13, wherein said single-drive locking pin is a shaft having a head at the distal end thereof, and said locking mechanism at the other end.

18. The apparatus of claim 17, wherein said locking mechanism has portions defining a flange that extends perpendicular to the shaft.

19. The apparatus of claim 17, wherein said head has a formed recess for mating with a tip or driver.

20. The apparatus of claim 13, wherein said locking mechanism is removable such that said single-drive locking pin can be manually disengaged from said engaging mechanism through first 90 degree rotation followed by non-rotating linear removal to uncouple said electrical device from said electrical speed box and said faceplate from said electrical device.

* * * * *